Oct. 17, 1933.  R. B. TAYLOR  1,931,211
CHOPPING MACHINE
Filed Dec. 26, 1929  2 Sheets-Sheet 1

INVENTOR.
R. B. TAYLOR.
BY Munn & Co.
ATTORNEYS.

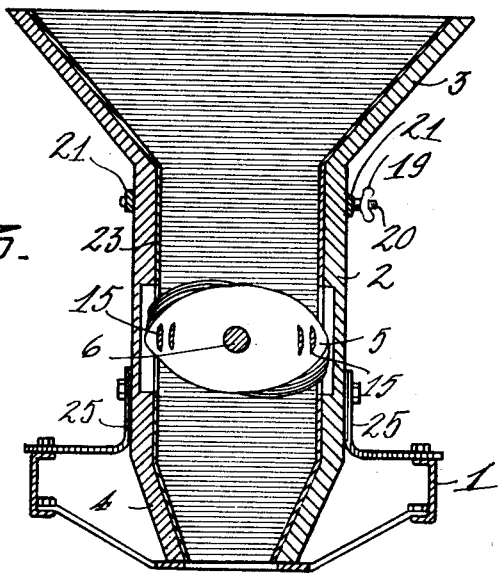
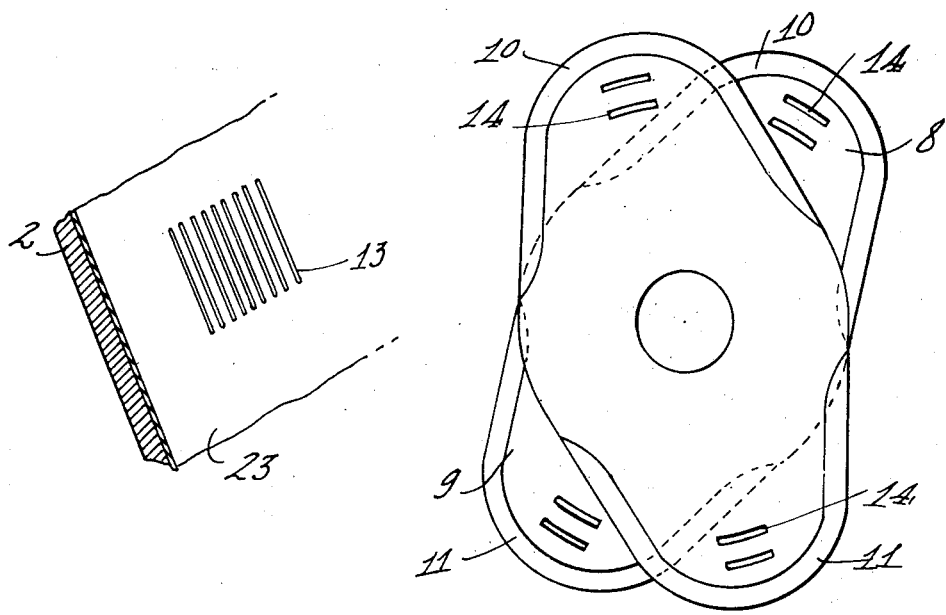

Patented Oct. 17, 1933

1,931,211

UNITED STATES PATENT OFFICE 1,931,211

CHOPPING MACHINE

Robert Brooks Taylor, Kapaa, Territory of Hawaii

Application December 26, 1929
Serial No. 416,605

5 Claims. (Cl. 146—123)

My invention relates to improvements in chopping machines, and it consists in the combinations, constructions and arrangements hereinafter described and claimed.

In the canning of pineapple, the more perfect slices are selected from the canning tables and are placed in the cans, processed, and subsequently sold. The imperfect slices, ends and smaller pieces, which are good in quality but not of proper shape for canning as they exist, are subsequently conveyed to a machine which is designed to shred, crush, grate, or otherwise reduce them to a common consistency which is ordinarily called crushed pineapple. Previously existing machines have, in this process of reduction, produced an excess of juice, and at the present time there is no demand for large quantities of pineapple juice. The action of the existing machines is such that the juice cells are disrupted and such a large amount of juice is produced that the pineapple pulp must be drained or partially drained in order to produce a product of a sufficiently heavy consistency to be marketable.

The principal object of my invention is to provide a machine which reduces the pineapple by a rapid cutting action rather than employing any method of squeezing, pressing, or striking, and thus the juice cells are not so badly damaged as in other machines and less juice is produced.

A further object of my invention is to provide a device of the type described which is simple in construction and has but one moving part.

A further advantage lies in the fact that the fineness of the product can be controlled over a very wide range by merely regulating the speed of the single moving part.

A still further advantage lies in the fact that the capacity of the machine in relation to its size is much greater than that of any machine designed for a similar purpose and now operating.

I do not wish to be confined to a machine that will only cut pineapple, because it is suitable for use in a large number of different industries, and it may be constructed so as to be practically acid-proof.

Other objects and advantages will appear as the specification proceeds, and the novel features of the device will be particularly pointed out in the claims hereto annexed.

Figure 1:
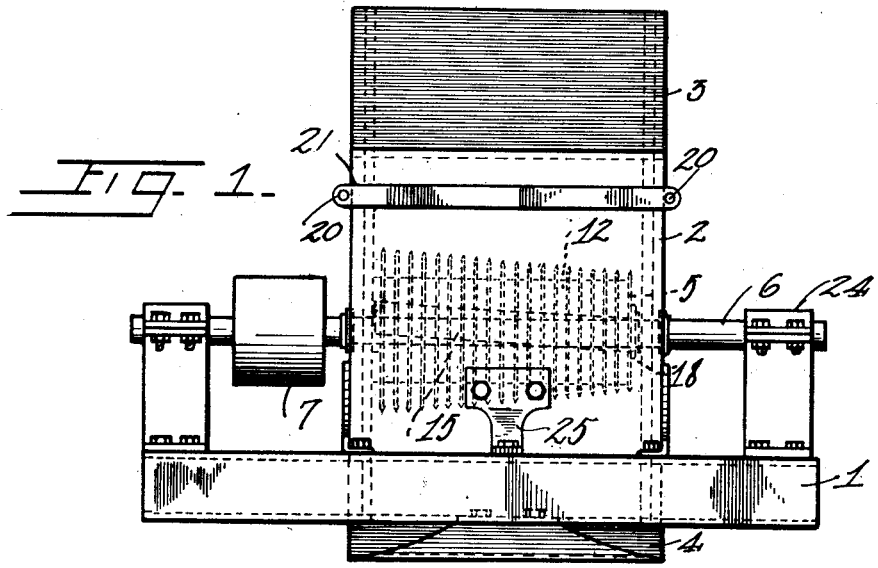
Figure 2:
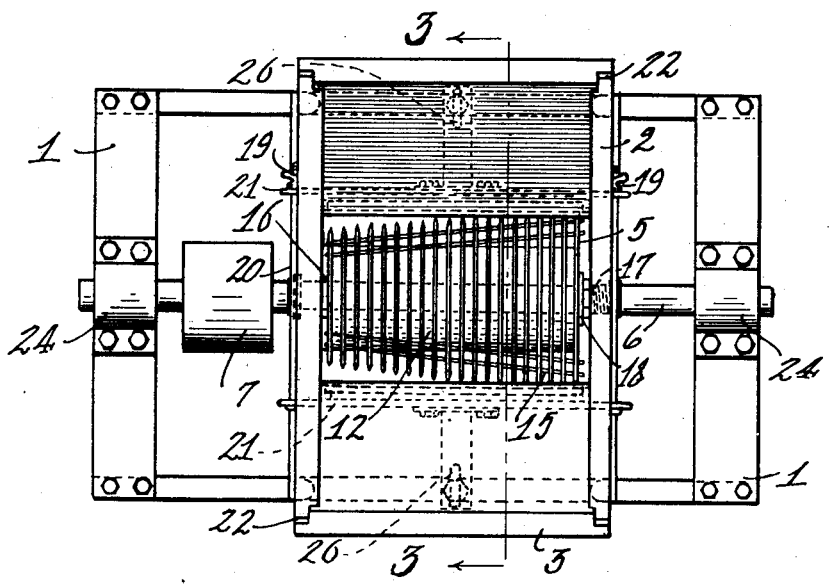

My invention is illustrated in the accompanying drawings, in which:

Figure 1 is a side elevation of the device,
Figure 2 is a top plan view,
Figure 3 is a section along the line 3—3 of Figure 2,
Figure 4 is a perspective view of a part of the device, and
Figure 5 is a detail view of two of the cutting blades.

In carrying out my invention, I provide a supporting frame indicated generally at 1. This frame carries a box-like member 2 that has a hopper 3 in its top and an outlet 4 in its bottom. Between the hopper 3 and the outlet 4, I mount a plurality of knives 5, these being mounted on a common shaft 6. The shaft 6 may be rotated by any suitable means. I have shown a pulley 7 secured to the shaft, and this pulley may be driven by a belt, (not shown) which in turn is driven by a source of power.

I have shown the shape of the knives 5 in Figure 5. It will be noted that each knife has reduced portions 8 and 9 that are disposed diametrically opposite each other. These portions have cutting edges 10 and 11 respectively. The cutting edges extend throughout the greater part of the peripheries of the knives.

In Figure 2 I show the knives 5 separated from each other by washers 12 or other suitable spacing means. The longer axis in each knife will cause it to enter grooves 13 (see Figure 4) in the sides of the box 2. The short axis of the knife 5 provides a space between the knife and the inner surface of the side wall of the box 2. The rotation of the knives by means of the shaft 6 will cause the knives to enter and leave the grooves 13 and thus give a cutting action to the pineapple or other substance, which will cut the pineapple into small pieces with but a slight loss of juice. The knives are made of acid-resisting material such as stainless steel, Monel metal, or the like. The washers 12 or spacers may be of such a width as to cause the machine to cut the pineapple into particles of satisfactory dimensions.

Referring again to Figure 5, it will be seen that the knives 5 have slots 14 therein. These slots receive long knives 15 that have a width equal to the width of the slots. The knives 5 are aligned with each other, and then the knives 15 are inserted in the aligned slots. The knives 5 are now twisted with respect to each other so that the knife at one end of the row will extend at a different angle from the knife at the opposite end of the row. I have shown these two extreme positions in Figure 5. The knives in between the two extreme positions of the end knives are disposed in stepped relation. The twisting of the knives 5 with respect to each other will cause them to lock with the knives 15 and to form a compact unit. It will be seen that the knives 15 form a spiral position around the shaft 6. The knives 5 and spacers 12 bear against a shoulder 16 on the shaft 6. The shaft 6 has a threaded portion 17 upon which a nut 18 is mounted. This nut clamps the knives and spacers solidly together.

From the foregoing description of the various parts of the device, the operation thereof may be readily understood.

The product to be cut is fed into the hopper 3 by any suitable means, and drops onto the rapidly-rotating knives which cut the particles thus dropped into the hopper. The knives by their spiral effect have a relation to the direction of rotation such that any cutting action produced by them will be slicing in effect. This will tend to keep the juice in the product and prevent it from being squeezed from the product in too large a quantity during the cutting operation.

The knives may be revolved in either direction due to the fact that they are sharpened on all sides. Thus when one edge becomes dull, the direction of rotation of the machine may be changed and the other unused edge will come into play.

The knives 5 may be allowed to enter the grooves or pockets 13 at varying depths. The depth at which the knives enter the grooves may be controlled by wing nuts 19 (see Figure 3) that are mounted upon rods 20 (also see Figures 1 and 2), these rods being removably secured to retaining members 21. A tightening of the wing nuts 19 will move the sides of the box 2 toward each other and will cause the knives 5 to enter the grooves 13 to a greater extent. Figure 2 shows a slight space between the sides and the ends of the box 2 so as to permit the sides to be moved toward each other. The space is represented by the reference numeral 22.

The supporting members 25 (see Figure 3) for the box 2 have slots 26 (see Figure 2) for permitting their adjustment with respect to the frame 1.

In cutting pineapple, it has been found that the best results are obtained when the outermost knives 15 almost touch the inner surfaces of the side walls of the box 2 when the knives pass these surfaces. The box 2, hopper 3, and discharge 4 may be lined with an acid-resisting metal 23 if desired. Of course, the number of knives and the distance between them is governed by the product and the fineness of the pieces into which the product is desired to be cut.

The shaft 6 is carried by bearings 24 (see Figure 1) and these bearings may be of the ball-bearing type if desired. By loosening the wing nuts 19, the sides of the box may be removed, thus allowing the knives 5 and 15 to be readily reached.

Although I have shown and described one embodiment of my invention, it is to be understood that the same is susceptible of various changes, and I reserve the right to employ such changes as may come within the scope of the invention as claimed.

I claim:

1. A chopping machine comprising a housing, a shaft mounted therein, oval knives carried thereby, said knives having aligned slots therein when the knives are aligned, longitudinally extending knives receivable in the slots, said first named knives being twisted for locking the second named knives in position, and means for rotating all of said knives as a unit, said housing having grooves for receiving said first named knives, the shorter axes of said oval knives being shorter than the distance from the shaft center to the grooves so that the peripheries of the knives adjacent the ends of the shorter axes do not enter the grooves.

2. In a chopping machine, a supporting shaft, a plurality of rotatable knives mounted thereon in spaced relation and having slots formed therein arranged at an inclination with respect to the radii of the knives, and longitudinally extending knives disposed in the slots.

3. In a chopping machine, a supporting shaft, a plurality of oval blades mounted thereon in spaced relation and transverse knives extending through the blades near the extremities thereof and arranged in peripheral planes.

4. In a chopping machine, a vertical conduit adapted to allow material to gravitate therethrough, an element revolvably mounted in said conduit intermediate the length thereof and dimensioned to occupy a major central portion of the conduit and a closely arranged set of oval blades on said element having transverse blades passing through the extremities thereof in peripheral planes.

5. In a chopping machine, a vertical conduit adapted to allow material to gravitate therethrough, an element revolvably mounted in said conduit intermediate the length thereof and dimensioned to occupy a major central portion of the conduit and a closely arranged set of oval blades on said element having transverse blades passing through the extremities thereof in peripheral planes, the set of oval blades being slightly twisted about the axis of rotation for locking the transverse blades and for producing slicing action.

ROBERT BROOKS TAYLOR.